(No Model.) 2 Sheets—Sheet 1.
G. E. & M. J. ANDERSON.
POTATO DIGGER
No. 475,373. Patented May 24, 1892.
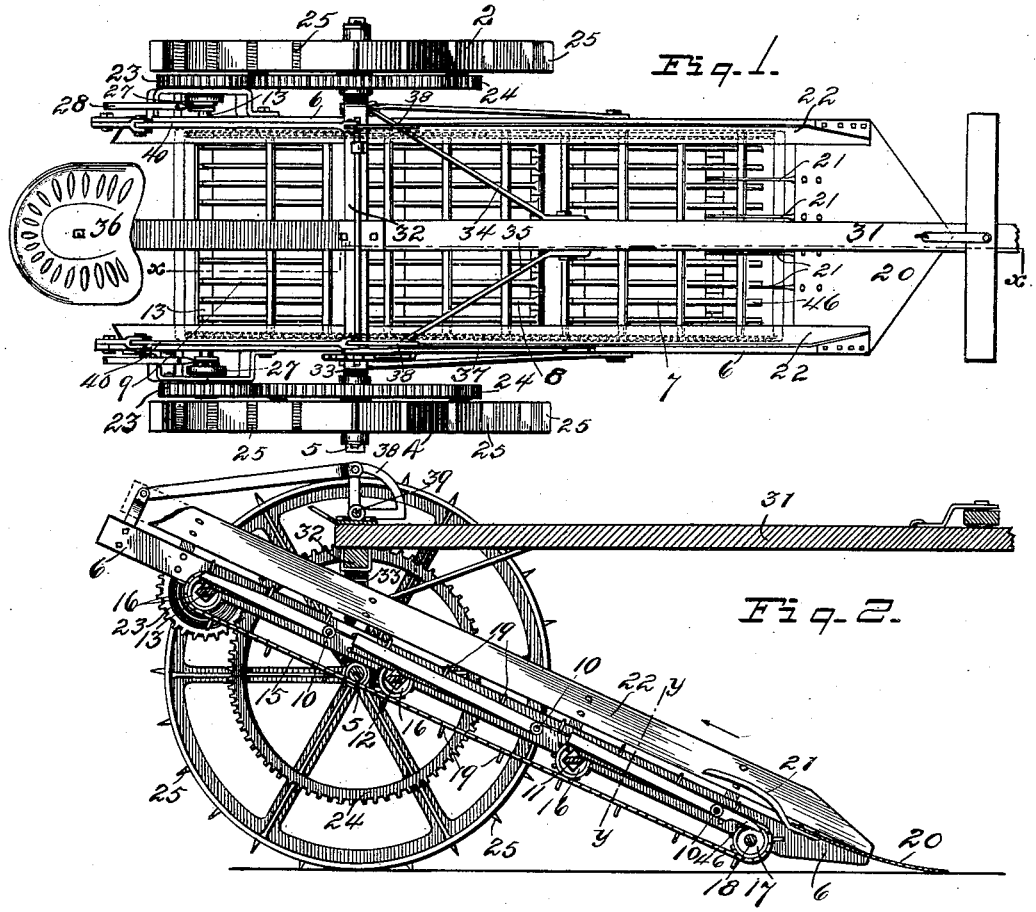
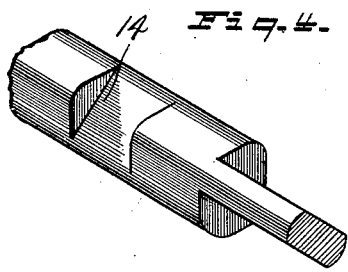
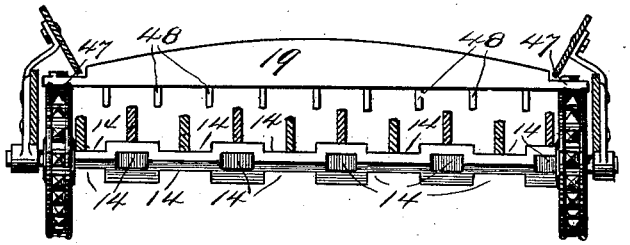
Witnesses.
C. E. Van Doren.
O. K. Hawley.
Inventors.
George E. Anderson.
Martin J. Anderson.
By Paul & Merwin
Attorneys.

(No Model.)  
G. E. & M. J. ANDERSON.  
POTATO DIGGER.  
2 Sheets—Sheet 2.
No. 475,373. Patented May 24, 1892.
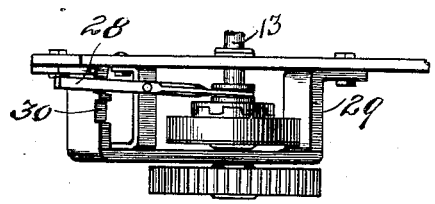
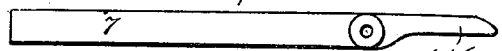
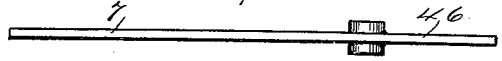
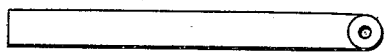
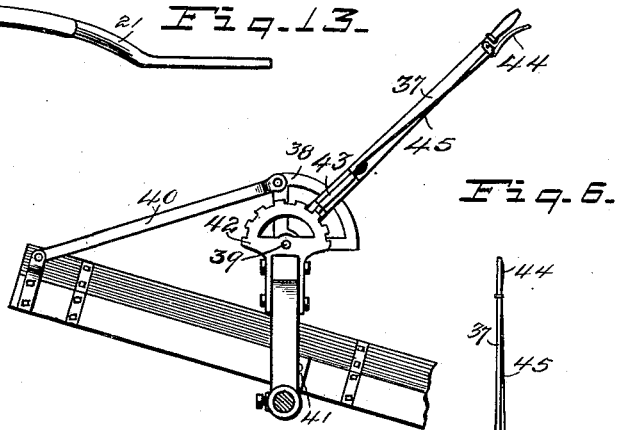
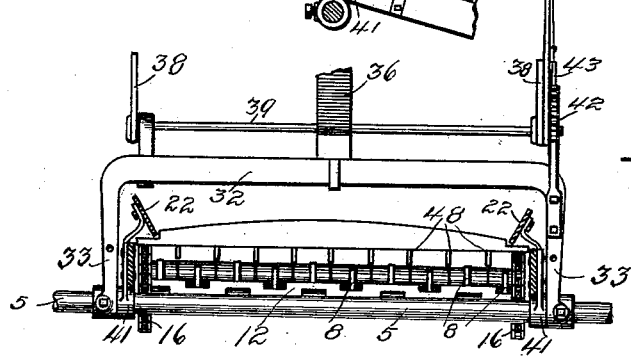
Witnesses.  
C. E. Van Dorn,  
O. G. Hawley.
Inventors.  
George E. Anderson  
Martin J. Anderson.  
By Paul & Merwin  
Attorneys.

UNITED STATES PATENT OFFICE.

GEORGE E. ANDERSON AND MARTIN J. ANDERSON, OF GRANTSBURG, WISCONSIN.

POTATO-DIGGER.

SPECIFICATION forming part of Letters Patent No. 475,373, dated May 24, 1892.

Application filed June 23, 1891. Serial No. 397,175. (No model.)

*To all whom it may concern:*

Be it known that we, GEORGE E. ANDERSON and MARTIN J. ANDERSON, both of Grantsburg, in the county of Burnett and State of Wisconsin, have invented a certain Improved Potato-Digger, of which the following is a specification.

Our invention relates to potato-diggers, and especially to machines for plowing potatoes out of the ground and at once elevating them and separating the potatoes from the dirt, &c.

The object of our invention is to provide a simple, durable, and efficient potato-digger adapted to be operated by a comparatively small power; and our invention consists in various constructions and combinations hereinafter described, and particularly pointed out in the claims.

Our invention will be more readily understood by reference to the accompanying drawings, in which—

Figure 1 is a plan view of a machine embodying our invention. Fig. 2 is a sectional view thereof on the line X X of Fig. 1. Fig. 3 is an enlarged transverse section on the line y y of Fig. 2. Fig. 4 is a detail of one of the vibrator-shafts. Fig. 5 shows the clutch mechanism employed. Fig. 6 is a partial side view showing means for raising and lowering the inclined bed of the machine. Fig. 7 is a transverse sectional view of the same parts of the machine. Figs. 8, 9, 10, 11, 12, and 13 are details.

As shown in the first two figures of the drawings, our machine is supported on the two large drive-wheels 2 and 4 and the axle 5 extending between them. The bed of the machine is made up of the inclined longitudinal sills 6 and the longitudinal slats 7, 8, and 9, arranged in three banks or tiers across the bed. These slats are pivoted at their lower ends on transverse rods 10 and their upper ends rest on the vibrator-shafts 11, 12, and 13, a sectional detail of which is shown in Fig. 4. Notches 14 are cut on opposite sides of these bars. Adjacent pairs of notches occupy opposite positions, as shown, whereby as one slat of a bank is raised the slats on either side thereof will be lowered. These vibrator-shafts are operated at a considerable speed, and hence the whole slanting bottom or bed of the machine is kept in constant and steady vibration, acting to forcibly separate the potatoes from the dirt or soil. The vibrator-shafts are rotated by the sprocket-chains 15, arranged on each side of the machine and passing over the small sprocket-wheels 16 and 17, secured on the vibrator-shafts, and upon the lower special shaft 18, arranged between the lower ends of the sills 6. In addition to the office of operating the vibrator-shafts the sprocket-chains, in connection with the cross flights or bars 19, form a conveyer adapted to carry the potatoes, dirt, &c., upward on the bed of the machine and also over the upper end thereof. From this upper end of the bed the clean potatoes are dropped on the ground or in a box arranged for their reception. Between the lower ends of the sills 6 and extending forward therefrom we provide the prow or share 20, adapted to pass beneath the potato-hills and to throw the same up onto the conveyer. To prevent any clogging, owing to the catching of the vines in the conveyer, we provide the curved fingers or tine-prongs 21, extending upward from the rear edge of the share 20 and far enough above the conveyer to allow the flights to pass freely beneath them. The inclined side guards or plates 22 tend to throw the potatoes, &c., toward the middle of the bed and extend, preferably, clear up to the top or upper end of the bed. The sprocket-chains are driven by the pinions 23, preferably arranged on each side of the machine, and mesh with the large gear-wheels 24, secured on the wheels 2 and 4. The lugs 25 are provided on the wheels 2 and 4 to prevent the same from slipping upon the ground, thereby failing to operate the conveyer and resulting in the clogging of the machine. The pinions 23 are secured upon the upper shaft 13 by ratchet-and-pawl connections, whereby turning or backing of the machine is rendered possible without any backward rotation of the pinion-wheels and the parts connected therewith. We provide a clutch 27 in connection with each pinion, whereby the same may be thrown in or out of connection with the shaft 13. The levers 28 are provided for the easy operation of the movable parts of the clutches, which parts operate upon longitudinal spines in the shaft 16. As shown in Fig. 5, the outer ends of the shaft 15 are strengthened by a strap 29, which is also provided with notches 30, by means of which the levers 28 may be fastened to hold the clutches in place. The machine is adapted to be drawn by horses hitched to the pole 31 at a point in advance of the prow or share 20. This pole or tongue is secured on the crossbar 32, raised above the bed of the machine and secured upon the axle 5 by the depending arms 33. (Shown plainly in Fig. 7.) Brace-rods 34 and 35 extend therefrom to the pole and to the bed of the machine to strengthen the same. Upon the rear end of the pole we provide the spring-seat 36, and within easy reach thereof the levers 28 28 and the lever 37, by means of which the forward end of the machine may be raised or lowered, as desired. The sectors 38 are secured upon the rocking shafts 39 and to the lever 37. From each a connecting-rod 40 extends back to the rear end of the sills, and it will be seen that when the lever 37 is drawn back that the sills and the bed of the machine pivoted on the axle by the bearings 41 will be tilted up, while when the lever is thrown forward the lower end of the machine will be allowed to sink into the ground. We provide the stationary notched piece or casting 42 in connection with the lever 37 and with the bolts 43, adapted to lock the same. The bolt may be withdrawn by means of the clasp 44 and rod 45, arranged on the lever 37. We preferably extend the lower end 46 of the slats 7, as shown, projecting over the shaft 18 and adapted to catch anything which may fall through the prongs 31. Anything falling upon these ends 46 will be carried onto the machine by the conveyer. The flights 19 of the conveyer preferably have the form shown in Fig. 3, and are provided with thin ends 47, extending beneath the guards 22 and fastened upon the sprocket 10. The teeth 48 extend down from the flights 19 and are adapted to clear out any material which may lodge between the vibrator-shafts.

Having thus described our invention, we claim as new and desire to secure by Letters Patent—

1. The combination, in a potato-digger, of supporting and driving wheels, with the inclined bed provided at its lower end with a prow or share, tiers of longitudinal vibrator-slats, shafts 11, 12, and 13, having notches 14 and adapted to operate said slats, and a conveyer adapted to carry the potatoes, &c., upward on said bed, substantially as described.

2. The combination, in a potato-digger, of the sills and the supporting-wheels, with the prow 20 arranged between the lower ends of said sills, the notched vibrator-shafts 11, 12, and 13 and the shaft 17, the sprockets arranged thereon, the sprocket-chains passing over the same, shafts or rods 10, extending between said sills, means for driving said sprocket-chains, flights or cross-bars 19, arranged thereon, and the longitudinal slats 7, 8, and 9, arranged, respectively, in banks or tiers and adapted to be operated by the revolution of said shafts 11, 12, and 13, respectively, substantially as described.

3. The combination, with the sills 6, of the wheels 2 and 4, arranged on the axle to support said sills, a prow or share 20, notched shafts 11, 12, and 13, bearings provided therefor in said sills, the longitudinal slats 7, 8, and 9, loosely pivoted on rods 10, the extended ends 46 of the slats 7, the shaft 18, sprockets arranged on all of said shafts, prongs 21, gear-wheels upon said wheels 2 and 4, and pinions 23, adapted to mesh therewith and secured upon the shaft 13 by suitable clutch devices, substantially as described.

4. The combination, with inclined sills, of wheels 2 and 4, the axle supporting the same, the prow 20, the vibrator-shaft and the shaft 18, sprocket-wheels arranged on the same, sprocket-chains and flights 19, adapted to operate over said sprocket-wheels, slats 7, 8, and 9, loosely pivoted on rods 10 and having their upper ends resting upon said vibrator-shafts and adapted to be operated thereby, means for driving said sprocket-chains by the forward movement of said wheels 2 and 4, a tongue 31, arranged in connection with said axle, and means for raising and lowering the lower end of the machine, substantially as described.

In testimony whereof we have hereunto set our hands this 18th day of June, 1891.

GEORGE E. ANDERSON.
MARTIN J. ANDERSON.

In presence of—
AND A. ANDERSON,
JAMES H. JENSEN.